(12) United States Patent
Kikugawa

(10) Patent No.: US 7,936,791 B2
(45) Date of Patent: May 3, 2011

(54) FRAME TRANSMISSION SYSTEM AND FRAME TRANSMISSION APPARATUS

(75) Inventor: Takumi Kikugawa, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 89 days.

(21) Appl. No.: 12/170,032

(22) Filed: Jul. 9, 2008

(65) Prior Publication Data

US 2009/0028156 A1  Jan. 29, 2009

(30) Foreign Application Priority Data

Jul. 27, 2007 (JP) ................................. 2007-196639

(51) Int. Cl.
*H04J 3/06* (2006.01)

(52) U.S. Cl. .......................... 370/503; 370/394; 370/252

(58) Field of Classification Search ........................ None
See application file for complete search history.

(56) References Cited

U.S. PATENT DOCUMENTS

| | | | | |
|---|---|---|---|---|
| 5,608,733 A * | 3/1997 | Vallee et al. | ................. | 370/394 |
| 6,134,246 A * | 10/2000 | Cai et al. | ........................ | 370/474 |
| 6,205,142 B1 * | 3/2001 | Vallee | ............................ | 370/394 |
| 6,222,858 B1 * | 4/2001 | Counterman | ................. | 370/474 |
| 6,570,852 B1 | 5/2003 | Suzuki | | |
| 6,574,191 B1 * | 6/2003 | Usukura et al. | ............... | 370/216 |
| 6,680,954 B1 * | 1/2004 | Cam et al. | ..................... | 370/474 |
| 6,775,305 B1 * | 8/2004 | Delvaux | ........................ | 370/535 |
| 6,798,783 B1 * | 9/2004 | Rangarajan et al. | .......... | 370/412 |
| 6,928,056 B2 * | 8/2005 | Evans | ........................ | 370/244 |
| 7,349,408 B2 * | 3/2008 | Rangarajan et al. | ..... | 370/395.51 |
| 7,567,620 B2 * | 7/2009 | Rozental | ...................... | 375/260 |
| 2002/0122439 A1 * | 9/2002 | Evans | ........................ | 370/535 |
| 2005/0036503 A1 * | 2/2005 | Rangarajan et al. | .......... | 370/412 |
| 2006/0015917 A1 * | 1/2006 | Rozental | ....................... | 725/111 |
| 2006/0104271 A1 * | 5/2006 | Samudra | ....................... | 370/389 |
| 2008/0298396 A1 * | 12/2008 | Schumann-Olsen | ......... | 370/477 |

FOREIGN PATENT DOCUMENTS

| | | |
|---|---|---|
| JP | 09-294099 | 11/1997 |
| JP | 11-341041 | 12/1999 |

* cited by examiner

*Primary Examiner* — Bob A Phunkulh
(74) *Attorney, Agent, or Firm* — Staas & Halsey LLP

(57) ABSTRACT

A frame transmission apparatus collects a plurality of frames supplied via multiple cables forming a single logic path based on link aggregation setting and outputs the collected frames to a single output line. The frame transmission apparatus includes a delay information storage unit which stores delay information indicating a transmission delay of each of the multiple cables, a reception timing correcting unit which corrects reception timings of the plurality of frames supplied via the multiple cables for the delay information corresponding to the multiple cables through which the plurality of frames have been supplied, and a data recovery unit which collects the plurality of frames supplied via the multiple cables in an order of the reception timings corrected by the reception timing correcting unit and outputs the collected frames to the output line.

5 Claims, 7 Drawing Sheets

FIG. 6

| ORDER OF ARRIVAL OF Ethernet FRAME HEADS | | ARRIVAL TIME OF Ethernet FRAME | CORRECTED ARRIVAL TIME OF Ethernet FRAME | ORDER OF RECOVERING Ethernet FRAMES |
|---|---|---|---|---|
| 1 | FRAME1 | T1 | T1-D1 | 1 |
| 2 | FRAME2 | T2 | T2-D2 | 2 |
| 3 | FRAME3 | T3 | T3-D1 | 3 |
| 4 | FRAME4 | T4 | T4-D1 | 4 |
| 5 | FRAME5 | T5 | T5-D1 | 5 |
| . | . | . | . | . |
| . | . | . | . | . |
| . | . | . | . | . |

FIG. 7

| ORDER OF ARRIVAL OF Ethernet FRAME HEADS | | ARRIVAL TIME OF Ethernet FRAME | CORRECTED ARRIVAL TIME OF Ethernet FRAME | ORDER OF RECOVERING Ethernet FRAMES |
|---|---|---|---|---|
| 1 | FRAME1 | T1 | T1-D1 | 1 |
| 2 | FRAME3 | T2 | T2-D1 | 3 |
| 3 | FRAME2 | T3 | T3-D2 | 2 |
| 4 | FRAME4 | T4 | T4-D1 | 4 |
| 5 | FRAME5 | T5 | T5-D1 | 5 |
| . | . | . | . | . |
| . | . | . | . | . |
| . | . | . | . | . |

US 7,936,791 B2

FRAME TRANSMISSION SYSTEM AND FRAME TRANSMISSION APPARATUS

CROSS-REFERENCE TO RELATED APPLICATIONS

This application is related to and claims priority to Japanese Patent Application No. 2007-196639 filed on Jul. 27, 2007, in the Japanese Patent Office, and incorporated by reference herein.

BACKGROUND

1. Field

The embodiment relates to frame transmission systems and frame transmission apparatuses for transmitting frames, and more particularly, to a frame transmission system and a frame transmission apparatus for implementing link aggregation.

2. Description of the Related Art

A link aggregation technique using multiple cables in an integrated manner as a single logic path is defined by Institute of Electrical and Electronic Engineers (IEEE) 802.3ad for frame transmission systems using Layer 2 switches to achieve higher capacity.

FIG. 1 is a block diagram showing an example of a network using an Ethernet frame transmission system.

The network shown in FIG. 1 includes a Layer 2 switch A 1 (hereinafter abbreviated as an "L2SWA1"), a Layer 2 switch B 2 (hereinafter abbreviated as an "L2SWB2"), and a Layer 2 switch C 3 (hereinafter abbreviated as an "L2SWC3"). The L2SWA1, the L2SWB2, and the L2SWC3 are each connected to a terminal 4. The L2SWA1 is connected to the L2SWB2 via three cables 5a, 5b, and 5c in parallel. The L2SWA1 is also connected to the L2SWC3 via a cable 5d. By setting the cables 5a, 5b, and 5c to form a link aggregation group, the cables 5a, 5b, and 5c can be logically handled as a single path. By setting the link aggregation group in this manner, a virtual path having a transmission band exceeding the transmission bands of the cables 5a, 5b, and 5c is realized.

FIG. 2 is a block diagram illustrating an Ethernet frame transmission system in the related art.

An L2SWA 91 at a sender side shown in FIG. 2 transfers a data stream constituted of a plurality of Ethernet frames (hereinafter may also be simply referred to as "frames") to an L2SWB 92 at a receiver side via two cables. The two cables each have a transmission capacity of 1 Gbps. The two cables are set to form a link aggregation group. The two cables are referred to as a "link aggregation (LA) path a" and an "LA path b". The L2SWA 91 includes an information extracting unit 911 which extracts information of frames supplied from a terminal (see FIG. 1), a distribution unit 912 which distributes the frames between the LA paths a and b, a hash calculation unit 917 which performs calculation using the extracted frame information, and two first-in first-out (FIFO) devices 915 and 916 corresponding to the LA paths a and b, respectively.

The information extracting unit 911 extracts Media Access Control (MAC) addresses from the header of each frame supplied to the L2SWA 91. The hash calculation unit 917 performs a hash calculation on the values of the extracted MAC addresses. A distribution processing determining unit 918 determines an LA path to transmit each frame in accordance with the result of the hash calculation. The distribution unit 912 distributes the frames between the FIFO devices 915 and 916 in accordance with the determination made by the distribution processing determining unit 918 and stores the distributed frames in the FIFO devices 915 and 916. The FIFO devices 915 and 916 output the stored frames in the order they are stored to the corresponding LA paths a and b, respectively.

In contrast, the L2SWB 92 at the receiver side shown in FIG. 2 collects frames transmitted via the two LA paths and outputs the collected frames to a terminal (see FIG. 1). The L2SWB 92 includes two FIFO devices 921 and 922 corresponding to the LA paths a and b, a multiplexer (MUX) 923, and a reading controller 924. Frames transmitted via the two cables are written into the FIFO devices 921 and 922. The reading controller 924 detects completion of writing of the frames into the FIFO devices 921 and 922. The reading controller 924 causes the multiplexer 923 to sequentially read the frames stored in the FIFO devices 921 and 922. The multiplexer 923 reconstructs the read frames. The multiplexer 923 outputs the reconstructed frames to a terminal. By integrating the two 1-Gpbs LA paths to form a single logic path, a 2-Gbps path is realized between the L2SWA 91 and the L2SWB 92.

In the Ethernet frame transmission system shown in FIG. 2, frames are distributed between the LA paths in accordance with the result of hash calculation of the MAC addresses of each frame. Accordingly, when frames with the same MAC addresses are transferred in a continuous manner, these frames are distributed to only one LA path. In this way, the paths are not efficiently utilized. In some cases, a FIFO overflow occurs, and the frames are discarded. In order to overcome this problem, frames with the same MAC addresses may be distributed among multiple LA paths, thereby utilizing the LA paths in an efficient manner. However, since frames with the same MAC addresses constitute a single stream, if these frames are distributed among multiple LA paths, the frames arrive at different times due to differences in transmission delay of the LA paths. As a result, the distributed frames may not be reconstructed in the original order.

For example, Japanese Unexamined Patent Application Publication Nos. 9-294099 and 11-341041 describe techniques for delaying a data transmission timing at a sender side according to the transmission delay. However, it is not practical to delay the transmission timing in a system where a link aggregation group has been formed to achieve higher processing rates.

SUMMARY

According to an aspect of an embodiment, there is provided an Ethernet frame transmission apparatus that collects a plurality of frames supplied via multiple cables forming a single logic path based on link aggregation setting and outputs the collected frames to a single output line. The Ethernet frame transmission apparatus includes a delay information storage unit which stores delay information indicating a transmission delay of each of the multiple cables, a reception timing correcting unit which corrects reception timings of the plurality of frames supplied via the multiple cables for the delay information corresponding to the multiple cables through which the plurality of frames have been supplied, and a data recovery unit which collects the plurality of frames supplied via the multiple cables in an order of the reception timings corrected by the reception timing correcting unit and outputs the collected frames to the output line.

These together with other aspects and advantages which will be subsequently apparent, reside in the details of construction and operation as more fully hereinafter described and claimed, reference being had to the accompanying drawings forming a part hereof, wherein like numerals refer to like parts throughout.

The above-described embodiments of the invention are intended as examples, and all embodiments of the invention are not limited to including the features described above.

BRIEF DESCRIPTION OF THE DRAWINGS

FIG. 6 is a frame recovery order correction table in case 1 (D1=D2); and

FIG. 7 is a frame recovery order correction table in case 2 (D1<D2).

DETAILED DESCRIPTION OF THE PREFERRED EMBODIMENTS

Figure 1:
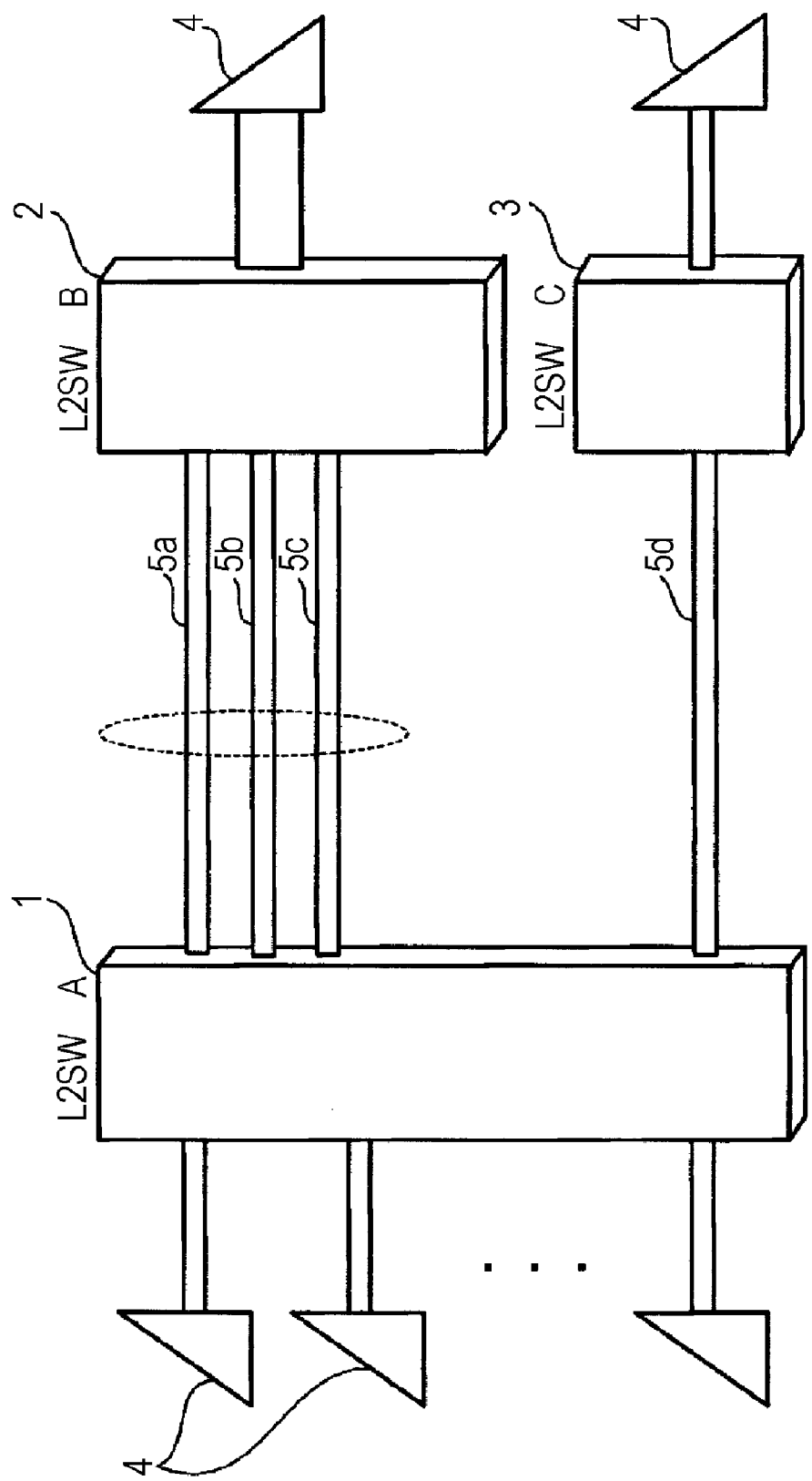
FIG. 1 is a block diagram illustrating an example of a network using an Ethernet frame transmission system.
Figure 2:
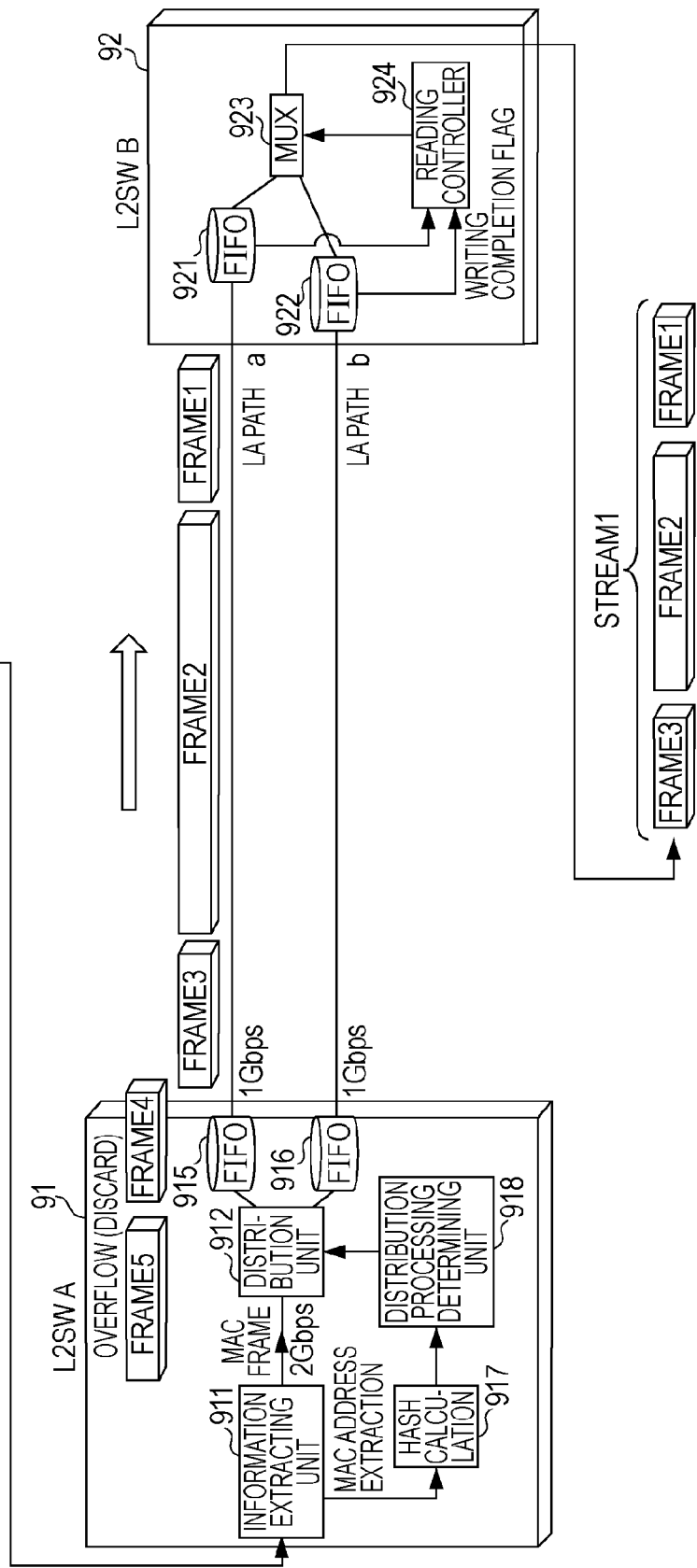
FIG. 2 is a block diagram illustrating an Ethernet frame transmission system in the related art.

Reference may now be made in detail to embodiments of the invention, examples of which are illustrated in the accompanying drawings, wherein like reference numerals refer to like elements throughout.

Embodiments are described with reference to the drawings.

Figure 3:
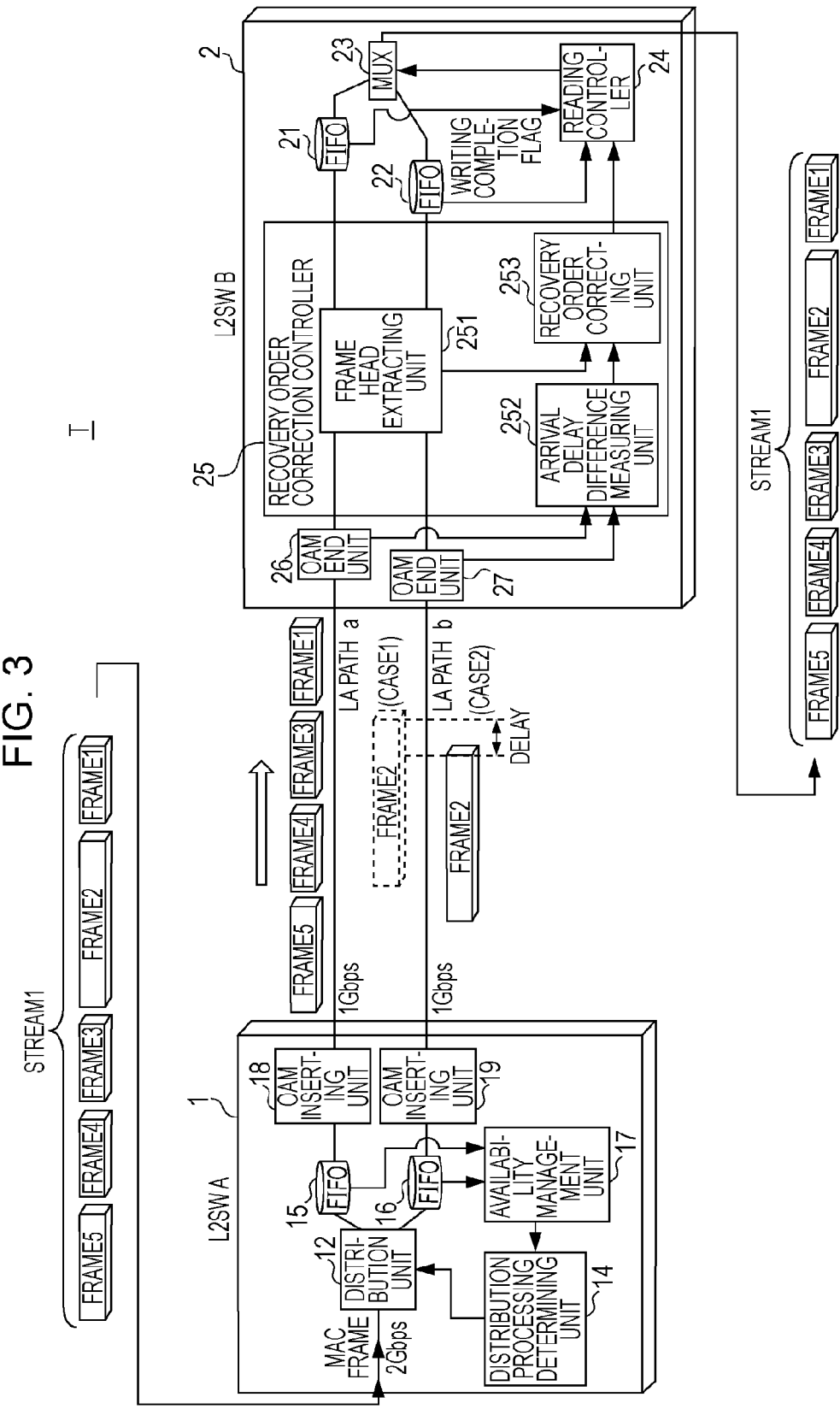
FIG. 3 is a block diagram illustrating an Ethernet frame transmission system according to an embodiment.

FIG. 3 is a block diagram illustrating an Ethernet frame transmission system according to an embodiment.

An Ethernet frame transmission system T shown in FIG. 3 is used by being incorporated into, for example, a network shown in FIG. 1. The Ethernet frame transmission system T includes two Layer 2 switches, namely, a Layer 2 switch A 1 (hereinafter abbreviated as an "L2SWA1") and a Layer 2 switch B 2 (hereinafter abbreviated as an "L2SWB2"). One switch, i.e., the L2SWA1, distributes a plurality of Ethernet frames (hereinafter referred to as "MAC frames" or simply as "frames") supplied from a terminal (see FIG. 1) via an input line between two cables and outputs the distributed frames to the two cables. The other switch, i.e., the L2SWB2, collects the frames supplied via the two cables and outputs the collected frames to a single output line. The two cables connecting the L2SWA1 and the L2SWB2 each have a transmission capacity of 1 Gbps. The two cables are set to form a link aggregation group. The two cables are referred to as an "LA path a" and an "LA path b". The L2SWA1 and the L2SWB2 are connected to the LA paths a and b, the input line, the output line, and other lines. The other lines and blocks relating to the other lines are not shown in FIG. 3, and descriptions thereof are omitted.

The L2SWA1 shown in FIG. 3 includes a distribution unit 12, two FIFO devices 15 and 16, a distribution processing determining unit 14, and an availability management unit 17. The L2SWA1 corresponds to an example of an Ethernet frame transmission apparatus according to the embodiment. A combination of the distribution unit 12 and the availability management unit 17 corresponds to an example of a distribution unit according to the embodiment.

The distribution unit 12 shown in FIG. 3 distributes a plurality of frames supplied via an input line between the two FIFO devices 15 and 16 in accordance with a determination made by the distribution processing determining unit 14 and stores the distributed frames in the FIFO devices 15 and 16.

The frames stored in the FIFO devices 15 and 16 are sequentially read in the order they are stored and output to the LA paths a and b corresponding to the FIFO devices 15 and 16, respectively.

The availability management unit 17 detects which of the LA paths a and b is less crowded according to the availability state of the FIFO devices 15 and 16. The availability management unit 17 detects a path corresponding to one of the FIFO devices 15 and 16 storing a smaller amount of data as a path having a less crowded band, that is, a path with a smaller amount of transmission data.

The distribution processing determining unit 14 causes the distribution unit 12 to distribute the next transmitted frame to the FIFO device corresponding to the LA path detected by the availability management unit 17. The availability management unit 17 and the distribution unit 12 give priority to, between the two LA paths, an LA path that has a smaller amount of transmission data and distribute a frame to this LA path which has been given priority. The availability management unit 17 and the distribution unit 12 prevent uneven use of the LA paths and maximize band utilization.

Two OAM inserting units 18 and 19 are provided between the FIFO devices 15 and 16 of the L2SWA1 and the LA paths a and b shown in FIG. 3. The OAM inserting units 18 and 19 output frames stored in the corresponding FIFO devices 15 and 16 to the corresponding LA paths a and b. The OAM inserting units 18 and 19 output maintenance frames for measuring delays of paths, that is, transmission delays due to the LA paths a and b. As the maintenance frames, Ether OAM frames defined by the International Telecommunication Union (ITU)-T Y.1731 are output. The OAM inserting units 18 and 19 each insert transmission timing information indicating a time serving as a timing of transmitting an Ether OAM frame into the Ether OAM frame.

In contrast, the L2SWB2 at a receiver side shown in FIG. 3 includes two OAM end units 26 and 27 functioning as the end of Ether OAM frames, two FIFO devices 21 and 22, a multiplexer (MUX) 23, a reading controller 24, and a recovery order correction controller 25. The recovery order correction controller 25 further includes a frame head extracting unit 251, an arrival delay difference measuring unit 252, and a recovery order correcting unit 253.

Each of the OAM inserting units 18 and 19 of the L2SWA1 shown in FIG. 3 corresponds to an example of a maintenance frame output unit according to the embodiment. The arrival delay difference measuring unit 252 of the L2SWB2 corresponds to an example of a delay information storage unit according to the embodiment. The recovery order correcting unit 253 corresponds to an example of a reception timing correcting unit according to the embodiment. A combination of the multiplexer 23 and the reading controller 24 corresponds to an example of a data recovery unit according to the embodiment.

The OAM end units 26 and 27 shown in FIG. 3 are connected to the two LA paths a and b, respectively. The OAM end units 26 and 27 receive frames transmitted via the corresponding LA paths a and b. The OAM end units 26 and 27 transfer the received frames to the frame head extracting unit 251 included in the recovery order correction controller 25. When the frames received by the OAM end units 26 and 27 are Ether OAM frames, the OAM end units 26 and 27 output no frames to the frame head extracting unit 251.

The OAM end units 26 and 27 extract transmission timing information included in the Ethernet OAM frames. The OAM end units 26 and 27 output the transmission timing information and reception timing information indicating reception timings of the Ethernet OAM frames to the arrival delay difference measuring unit 252. The arrival delay difference measuring unit 252 calculates and stores a delay of each LA path on the basis of the transmission timing information and the reception timing information of the Ether OAM frames.

Accordingly, a delay difference between the paths is measured. The frame head extracting unit 251 stores the frames in the FIFO devices 21 and 22 corresponding to the LA paths a and b. The frame head extracting unit 251 outputs reception timing information indicating a timing at which the head of each frame has arrived to the recovery order correcting unit 253.

The recovery order correcting unit 253 of the L2SWB2 shown in FIG. 3 corrects the reception timing information of each frame for a delay of a corresponding one of the LA paths, which is stored by the arrival delay difference measuring unit 252. Accordingly, the timing of outputting each frame from the L2SWA1 is estimated.

Based on the estimated timing, the order of frames is determined. When the reading controller 24 detects writing of frames into the FIFO devices 21 and 22, the reading controller 24 causes the multiplexer 23 to read the frames from the FIFO devices 21 and 22 in the order determined by the recovery order correcting unit 253. The multiplexer 23 sequentially outputs the read frames.

FIG. 3 illustrates an example in which the Ethernet frame transmission system T transmits a data stream constituted of five Ethernet frames including frame 1 to frame 5.

The data stream transmitted in the example shown in FIG. 3 is transmitted from one terminal (see FIG. 1) at the sender side to one terminal at the receiver side. The five frames 1 to 5 shown in FIG. 3 have the same MAC addresses. In other words, the five frames 1 to 5 have the same source address (SA) and the same destination address (DA). The five frames 1 to 5 are supplied from the terminal at the sender side to the L2SWA1 in the order of frames 1 to 5.

When the first frame 1 is supplied to the L2SWA1 shown in FIG. 3, the distribution unit 12 in the L2SWA1 stores the frame 1 in the FIFO device 15 corresponding to the LA path a. The frame 1 stored in the FIFO device 15 is output at a predetermined bit rate via the OAM inserting unit 18 to the LA path a.

Next, when the second frame 2 is supplied, since the amount of data stored in the FIFO device 16 is less than that stored in the FIFO device 15, the availability management unit 17 determines that the band of the LA path b is less crowded. The distribution processing determining unit 14 causes the distribution unit 12 to store the frame 2 in the FIFO device 16 corresponding to the LA path b.

The frame 2 stored in the FIFO device 16 is output at a predetermined bit rate to the LA path b. The next supplied third frame 3 is stored in the FIFO device 15 storing a smaller amount of data. The second frame is larger than the other frames. Even when the fourth frame 4 and the fifth frame 5 are supplied, the FIFO device 15 stores a smaller amount of data. Accordingly, the fourth frame 4 and the fifth frame 5 are also stored in the FIFO device 15 and are output to the LA path a.

The five frames are distributed between the two LA paths a and b and are transmitted in parallel. The five frames are shown in between the L2SWA1 and the L2SWB2 of FIG. 3. The five frames shown in FIG. 3 are illustrated side by side, from right to left, in accordance with timings at which the five frames are transmitted via the LA paths a and b and received by the L2SWB2. The LA paths a and b normally have different transmission delays.

In FIG. 3, the reception timing of the frame 2 is illustrated in broken lines in case 1 where the LA paths a and b have the same delay. In contrast, the reception timing of the frame 2 is illustrated in solid lines in case 2 where the LA path b has a longer delay than that of the LA path a.

The L2SWB2 at the receiver side shown in FIG. 3 collects the five frames transmitted in a distributed manner between the LA paths a and b and outputs the collected frames to a terminal at the receiver side. The frames 1 to 5 are temporarily arranged in line in the order they are received by the L2SWB2, that is, in the order the heads of the frames arrived at the L2SWB2. Accordingly, when the LA paths a and b have the same delay (case 1), the frames 1 to 5 are arranged in the same order as they are output from the L2SWA1 at the sender side. However, when the LA path b has a longer delay than that of the LA path a (case 2), the frame 2 is arranged subsequent to the frame 3, and the frames 1 to 5 are arranged in the order different from the order they are output from the L2SWA1. Accordingly, the L2SWB2 of the embodiment corrects reception timing information for a difference in delay between the LA paths a and b.

The function of correcting reception timing information is described.

Figure 4:
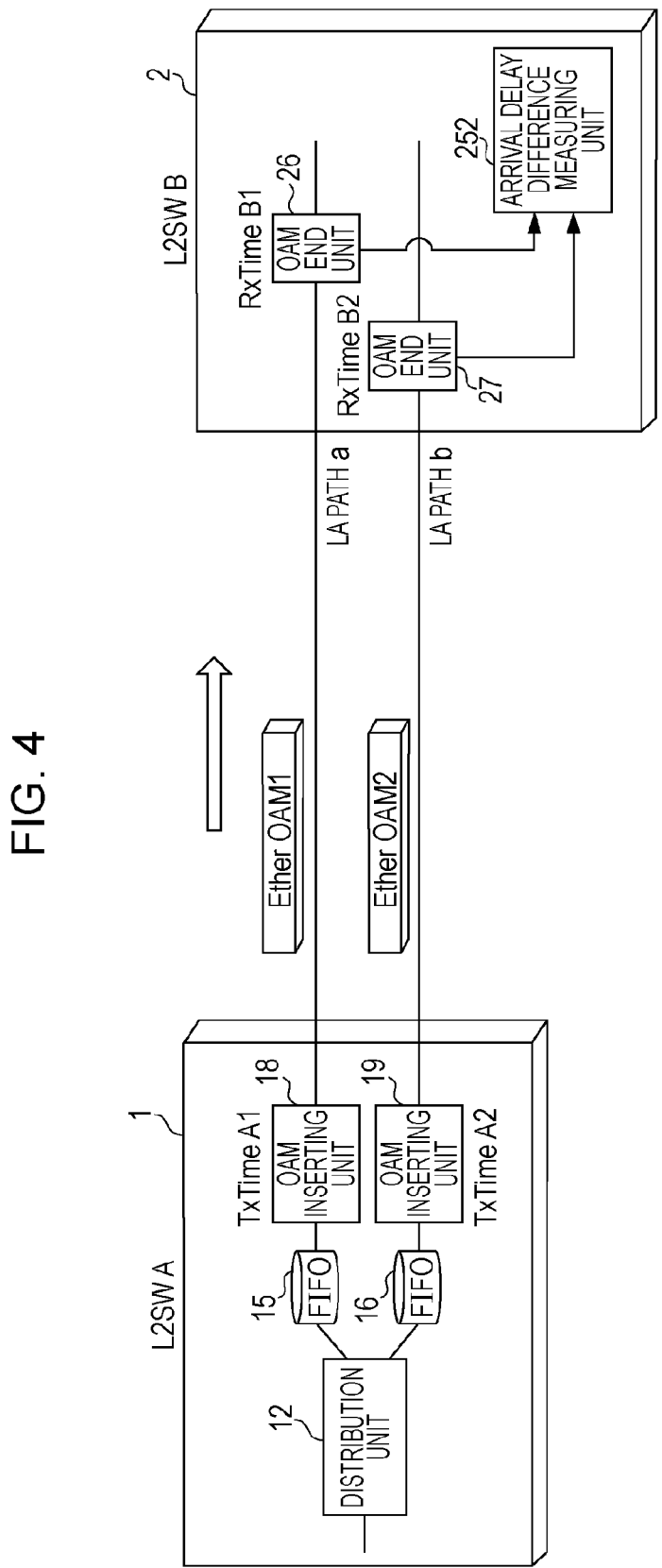
FIG. 4 is a block diagram illustrating transmission of Ether Operations, Administration, and Maintenance (OAM) frames in the Ethernet frame transmission system shown in FIG. 3.
Figure 5:
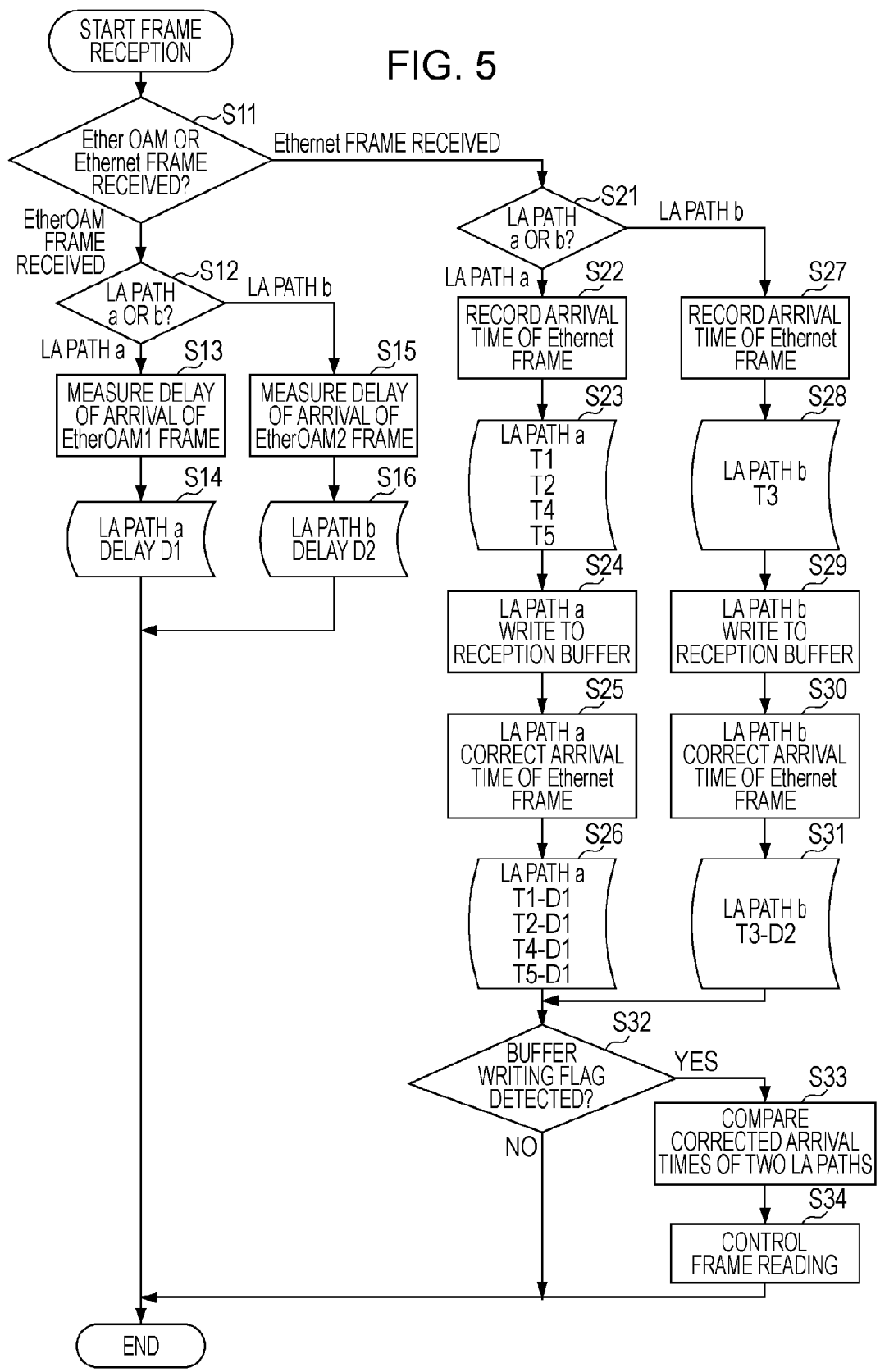
FIG. 5 is a flowchart for describing a process performed by an L2SWB2 at a receiver side.

FIG. 4 is a block diagram illustrating transmission of Ether OAM frames in the Ethernet frame transmission system shown in FIG. 3. FIG. 5 is a flowchart for describing a process performed by the L2SWB2 at the receiver side. The process shown in FIG. 5 is performed every time an Ether OAM frame or an Ethernet frame is sent via the LA path a or b to the L2SWB2.

The OAM inserting units 18 and 19 of the L2SWA1 shown in FIG. 4 periodically generate Ether OAM frames and output the generated Ether OAM frames to the corresponding LA paths a and b. The OAM inserting unit 18 inserts transmission timing information indicating a transmission timing TxTime A1 of an Ether OAM 1 frame into the Ether OAM 1 frame and outputs the Ether OAM frame 1 to the LA path a.

In contrast, the OAM inserting unit 19 inserts transmission timing information indicating a transmission timing TxTime A2 of an Ether OAM 2 frame into the Ether OAM 2 frame and outputs the Ether OAM 2 frame to the LA path b. The Ether OAM 1 frame has the same Ethernet frame format as frames constituting a stream. In the description of the embodiment, frames into which transmission timing information is inserted are referred to as "Ether OAM frames". Frames constituting a stream are referred to as "Ethernet frames" (or simply as "frames").

In the L2SWB2 at the receiver side shown in FIG. 4, a frame that has been received via the LA path a or b is an Ethernet OAM frame (which corresponds to Ether OAM frame reception in operation S11 of FIG. 5). When this Ether OAM frame has been transmitted via the LA path a (which corresponds to the LA path a in operation S12 of FIG. 5), the OAM end unit 26 receives the Ether OAM 1 frame transmitted via the LA path a.

The OAM end unit 26 measures arrival delay of the received Ether OAM 1 frame (S13 of FIG. 5). More specifically, the OAM end unit 26 extracts transmission timing information from the received Ether OAM 1 frame and outputs the extracted transmission timing information to the arrival delay difference measuring unit 252. Further, the OAM end unit 26 outputs timing RxTime B1 at which the Ether OAM 1 frame has been received to the arrival delay difference measuring unit 252.

The arrival delay difference measuring unit 252 calculates a transmission delay D1 of the LA path a on the basis of the difference between the transmission timing TxTime A1 and the reception timing RxTime B1 of the Ether OAM 1 frame (S14 of FIG. 5). In contrast, when the Ether OAM frame has been transmitted via the LA path b (which corresponds to the LA path b in operation S12 of FIG. 5), the OAM end unit 27 receives the Ether OAM 2 frame. The OAM end unit 27 measures an arrival delay of the received Ether OAM 2 frame (S15 of FIG. 5).

More specifically, the OAM end unit 27 extracts transmission timing information from the received Ether OAM 2 frame and outputs the extracted transmission timing information to the arrival delay difference measuring unit 252. Further, the OAM end unit 27 outputs timing RxTime B2 at which the Ether OAM 2 frame has been received to the arrival delay difference measuring unit 252. The arrival delay difference measuring unit 252 calculates a transmission delay D2 of the LA path b on the basis of the difference between the transmission timing TxTime A2 and the reception timing RxTime B2 of the Ether OAM 2 frame (S16 of FIG. 5). Accordingly, the L2SWB2 obtains the transmission delays D1 and D2 of the LA paths a and b, respectively.

Referring back to FIG. 3 and with continued reference to FIG. 5, transmission and collection of frames constituting a data stream will be described.

The five frames 1 to 5 shown in FIG. 3 are distributed by the L2SWA1 at the sender side between the LA paths a and b and are output to the LA paths a and b. In the example shown in FIG. 3, the first frame 1, the third frame 3, the fourth frame 4, and the fifth frame 5 are transmitted via the LA path a, and the remaining second frame 2 is transmitted via the LA path b.

The L2SWB2 at the receiver side shown in FIG. 3 receives the five frames 1 to 5 via the LA paths a and b.

When the received frame has been transmitted via the LA path a (which corresponds to the LA path a in operation S21 of FIG. 5), the OAM end unit 26 shown in FIG. 3 transfers the frame as it is to the frame head extracting unit 251. The frame head extracting unit 251 outputs the timing (time) at which the frame has been received, that is, information indicating the time at which the head of the frame has arrived, to the recovery order correcting unit 253, and the recovery order correcting unit 253 records the information (S22 of FIG. 5). The frame head extracting unit 251 stores the frame in the FIFO device 21 corresponding to the LA path a (S24 of FIG. 5). The arrival times of the frames are indicated by T1 to T5 in the order of arrival. For example, the arrival times of the frames transmitted via the LA path a are indicated by T1, T2, T4, and T5 (S23 of FIG. 5).

Next, the recovery order correcting unit 253 shown in FIG. 3 corrects the Ethernet frame arrival time corresponding to the LA path a (S25 of FIG. 5). The recovery order correcting unit 253 subtracts the transmission delay D1 of the LA path a, which is shown in S14 of FIG. 5, from the reception timing information (Ethernet frame arrival time) of the frame transmitted via the LA path a. Accordingly, the corrected arrival time of the frame transmitted via the LA path a can be obtained. For example, when the processes of operations S22 to S25 described above are performed for the frames 1, 3, 4, and 5 transmitted via the LA path a, the corrected arrival times T1-D1, T2-D1, T4-D1, and T5-D1 are obtained (S26 of FIG. 5).

When the frame has been transmitted via the LA path b (which corresponds to the LA path b in operation S21 of FIG. 5), the Ethernet frame arrival time is recorded (S27 of FIG. 5). The OAM end unit 27 transfers the frame as it is to the frame head extracting unit 251. The frame head extracting unit 251 outputs the timing (time) at which the frame has been received, that is, reception timing information indicating the time at which the head of the frame has arrived, to the recovery order correcting unit 253. The frame head extracting unit 251 stores the frame in the FIFO device 22 corresponding to the LA path b (S29 of FIG. 5). For this frame, as in the frame that has been transmitted via the LA path a, a process of correcting the arrival time of the Ethernet frame transmitted via the LA path b is performed (S30 of FIG. 5). In the case of the LA path b, the transmission delay D2 of the LA path b is subtracted. Accordingly, the corrected arrival time T3-D2 is obtained (S31 of FIG. 5).

FIG. 6 illustrates the arrival time of each frame, the result of correcting the arrival time of each frame, and a frame recovery order in case 1 where there is no difference between the transmission delays D1 and D2 of the LA paths a and b. FIG. 7 illustrates information in case 2 where the transmission delay D2 of the LA path b is longer than the transmission delay D1 of the LA path a. Items of information of the frames are arranged in the order the heads thereof arrived. Reference symbols T1 to T5 indicating the arrival times shown in the flowchart of FIG. 5 show the case shown in FIG. 7.

When there is no difference between the transmission delays D1 and D2 as shown in FIG. 6, the five frames arrive at the L2SWB2 in the following order: frame 1, frame 2, frame 3, frame 4, and frame 5. Also, the transmission delays D1 and D2 are equal. Accordingly, the results of correcting the arrival times T1 to T5 of the frames for the transmission delays D1 and D2, namely, the values of T1-D1, T2-D2, T3-D1, T4-D1, and T5-D1, are also in this order. The stream can be normally reconstructed by collecting the five frames sent from the L2SWA1 in the following order: frame 1, frame 2, frame 3, frame 4, and frame 5.

FIG. 7 illustrates the arrival time of each frame, the result of correcting the arrival time of each frame, and a frame recovery order in the exemplary case where the transmission delay D2 of the LA path b is longer than the transmission delay D1 of the LA path a.

When the transmission delay D2 is longer than the transmission delay D1 as shown in FIG. 7, the frame 2 arrives after the frame 3. In other words, the five frames 5 arrive at the L2SWB2 in the following order: frame 1, fame 3, frame 2, frame 4, and frame 5. The values of the results of correcting the arrival times T1 to T5 of the frames for the transmission delays D1 and D2 are such that T3-D2 for the frame 2 is less than T2-D1 for the frame 3. As a result, the corrected values are in the following order as shown in FIG. 7: frame 1, frame 2, frame 3, frame 4, and frame 5. That is, even when the transmission delay D2 is longer than the transmission delay D1, the stream can be normally reconstructed by collecting the five frames in the following order: frame 1, frame 2, frame 3, frame 4, and frame 5.

Referring back to FIG. 5, the remaining process is described. The reading controller 24 shown in FIG. 3 detects a buffer writing flag (S32 of FIG. 5). When the reading controller 24 detects writing of frames into the FIFO devices 21 and 22 (yes in S32), the reading controller 24 compares the corrected arrival times of the two LA paths a and b. The reading controller 24 compares the results of correcting the arrival times of the frames in FIG. 6 or 7 and determines a recovery order, as shown in the rightmost column of FIG. 6 or 7. Thereafter, the reading controller 24 causes the multiplexer 23 to read the frames from the FIFO devices 21 and 22 in the determined recovery order (S34 of FIG. 5). The multiplexer 23 sequentially outputs the read frames. Accordingly, the order of frames is recovered to normal.

Although the description assumes that OAM frames are periodically transmitted in the embodiment, the maintenance frames of the embodiment are not limited thereto. For example, OAM frames may be transmitted only at the time the system is booted. However, when OAM frames are transmitted in a continuous manner, fluctuations in delay time due to changes in environmental conditions such as temperature can be dynamically tracked. In some cases, periodical transmission of OAM frames may coincide with the transmission timing of Ethernet frames. In such a case, an Ethernet frame is put aside, and an OAM frame is given priority to be transmitted. Alternatively, priority may be given to an Ethernet frame.

Although the example using two LA paths has been described in the embodiment, the cables of the embodiment are not limited thereto. For example, three or more cables may be used.

As has been described above, according to the embodiment, an Ethernet frame transmission system and an Ethernet frame transmission apparatus for efficiently utilizing multiple cables and for recovering the order of frames to normal are implemented.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

Although a few preferred embodiments of the invention have been shown and described, it would be appreciated by those skilled in the art that changes may be made in these embodiments without departing from the principles and spirit of the invention, the scope of which is defined in the claims and their equivalents.

What is claimed is:

1. A frame transmission apparatus that collects a plurality of frames supplied via multiple cables forming a single logic path based on link aggregation setting and outputs the collected frames to a single output line, the apparatus comprising:
   a delay information storage unit which stores delay information indicating a transmission delay measured at a receiving side of each of the multiple cables;
   a reception timing correcting unit which corrects reception timings of the plurality of frames supplied via the multiple cables for the delay information corresponding to the multiple cables through which the plurality of frames have been supplied; and
   a data recovery unit which collects the plurality of frames supplied via the multiple cables in an order of the reception timings corrected by the reception timing correcting unit and outputs the collected frames to the output line.

2. A frame transmission system for transmitting data constituted of a plurality of frames transferred in a sequential manner, the system comprising:
   a sender-side transmission apparatus that distributes the plurality of frames supplied via an input line among multiple cables forming a single logic path based on link aggregation setting and outputs the plurality of frames to the multiple cables; and
   a receiver-side transmission apparatus that collects the plurality of frames supplied in a distributed manner among the multiple cables and outputs the collected frames to a single output line,
   wherein said sender-side transmission apparatus includes
   a maintenance frame output unit which inserts, into a maintenance frame for measuring a delay of each of the multiple cables, transmission timing information indicating a transmission timing of the maintenance frame and outputs the maintenance frame to each of the multiple cables, and
   wherein said receiver-side transmission apparatus includes
   a delay information storage unit which receives the maintenance frame supplied via each of the multiple cables and obtains delay information of each of the multiple cables on the basis of the transmission timing information inserted into the maintenance frame and a reception timing of the maintenance frame,
   a reception timing correcting unit which corrects reception timings of the plurality of frames supplied via the multiple cables for the delay information corresponding to the multiple cables through which the plurality of frames have been supplied, and
   a data recovery unit which collects the plurality of frames in an order of the reception timings corrected by the reception timing correcting unit and outputs the collected frames to the output line.

3. The frame transmission system according to claim 2, wherein the maintenance frame output unit outputs, as the maintenance frame, an Ether OAM frame defined by ITU-T Y.1731.

4. The frame transmission system according to claim 2, wherein the sender-side transmission apparatus includes a distribution unit which gives priority to, among the multiple cables, a cable with a smaller amount of transmission data and distributes a frame to the cable given priority.

5. A method of collecting a plurality of frames supplied via multiple cables forming a single logic path based on link aggregation setting and outputting the collected frames to a single output line, the method comprising:
   storing delay information indicating a transmission delay measured at a receiving side of each of the multiple cables;
   correcting reception timings of the plurality of frames supplied via the multiple cables for the delay information corresponding to the multiple cables through which the plurality of frames has been supplied; and
   collecting the plurality of frames supplied via the multiple cables in an order of the reception timings corrected by the reception timing correcting unit and outputs the collected frames to the output line.

* * * * *